United States Patent [19]

Sumner et al.

[11] 3,961,881

[45] June 8, 1976

[54] COLORATION PROCESS

[75] Inventors: Harry Hall Sumner; Gerald Williams, both of Manchester, England

[73] Assignee: Imperial Chemical Industries Limited, London, England

[22] Filed: July 22, 1974

[21] Appl. No.: 490,493

[30] Foreign Application Priority Data

Aug. 21, 1973 United Kingdom............... 39429/73

[52] U.S. Cl............................................. 8/17; 8/15; 8/65; 8/178 R; 8/DIG. 21
[51] Int. Cl.$^2$........................ D06P 3/06; D06P 3/26
[58] Field of Search................................... 8/15, 17

[56] References Cited
UNITED STATES PATENTS

| | | | |
|---|---|---|---|
| 2,574,597 | 11/1951 | Salvin et al. | 8/79 |
| 2,922,690 | 1/1960 | Mueller et al. | 8/21 |
| 3,467,484 | 9/1969 | Hermes | 8/15 |
| 3,713,768 | 1/1973 | Wegmuller et al. | 8/15 |

*Primary Examiner*—Ronald W. Griffin
*Attorney, Agent, or Firm*—Cushman, Darby & Cushman

[57] ABSTRACT

Process for coloring synthetic polyamide textile materials which comprises applying to the said textile materials by a dyeing, padding or printing process, an aqueous dispersion of pH less than 7 of a disperse dyestuff containing at least one carboxylic acid group and in the presence of a tanning agent, whereby level colorations are obtained which have excellent wet fastness properties.

5 Claims, No Drawings

COLORATION PROCESS

This invention relates to an improved process for coloring synthetic polyamide textile materials.

Although it is known to use disperse dyestuffs for coloring synthetic polyamide textile materials, such dyestuffs while giving excellent coverage of any physical and/or chemical irregularities present in the synthetic polyamide fibres give colorations of extremely poor wet fastness properties. While water-soluble dyestuffs containing sulphuric acid groups, in particular of the class known as acid dyestuffs, give dyeings on synthetic polyamide textile materials which have much better fastness to wet treatments, such dyestuffs do not satisfactorily cover physical and/or chemical irregularities present in the fibres so that it is very difficult to achieve uniform colorations. While the use of dyebath auxiliaries with such dyestuffs can improve the levelling properties their use invariably leads to a reduction in wet fastness properties which can only be overcome by a subsequent aftertreatment with a tanning agent. A separate treatment is however essential for these agents, as, if they are simultaneously applied with such dyestuffs severe restraining of the dyestuff takes place so that only pale colorations are obtained.

It has now been found that the above difficulties can be overcome, so that level colorations of excellent wet fastness are obtained, by coloring synthetic polyamide textile materials with a disperse dyestuff containing a carboxylic acid group in the presence of a tanning agent.

According to the present invention there is provided an improved process for coloring synthetic polyamide textile materials which comprises applying to the said textile materials an aqueous dispersion of pH less than 7 containing at least one disperse dyestuff containing a carboxylic acid group in the presence of a tanning agent.

The tanning agent can be applied to the said textile materials before the dyestuff, but preferably the two are applied together.

The said aqueous dispersion can be applied to the said textile material by a dyeing, padding or printing method using the conditions conventionally employed in applying disperse dyestuffs by such methods to synthetic polyamide textile materials.

Thus, for example, the synthetic polyamide textile material can be immersed in a dyebath having a pH of less than 7 comprising an aqueous dispersion of at least one of the said dyestuffs and which also contains a tanning agent, and dyeing is then carried out at temperatures in the region of 80°C up to the boiling point of the dyebath. The dyed textile material is then removed from the dyebath, rinsed in water, if desired given a rinse in an aqueous alkaline solution of soap or a synthetic detergent, then rinsed in water, and finally dried.

Alternatively an aqueous liquor or print paste of pH less than 7 containing the said dyestuff or dyestuffs and also the tanning agent is padded or printed onto the synthetic polyamide textile material, which, if desired, is then dried and finally subjected to the action of steam or dry heat. The textile material is then given an alkaline "soaping" treatment, rinsed in water, and is finally dried.

The said dyebath, padding liquor or print paste has a pH of less than 7, preferably a pH of from 3 to 5, and this is obtained by including in the said dyebath, padding liquor or print paste an acid or acid salt, such as acetic acid, formic acid, ammonium acetate, ammonium sulphate or sodium dihydrogen phosphate. Alternatively there can be used acid generators, i.e., compounds, such as diethyl tartrate, which liberate an acid on heating.

The said dyebaths, padding liquors or print pastes can in addition contain any of the adjuvants which are commonly employed in applying disperse dyestuffs to synthetic polyamide textile materials, for example water-soluble thickening agents such as alginate and hydrolyzed polyacrylonitrile, anionic, non-ionic or cationic dispersing agents, urea and sodium m-nitrobenzene sulphonate.

Instead of applying the dyestuff and the tanning agent simultaneously to the polyamide textile material, the dyestuff can be applied from a dyebath, padding liquor or print paste to a pre-tanned polyamide textile material, which can be prepared for example, by padding the polyamide textile material with an aqueous padding liquor containing the tanning agent and then drying.

The aqueous dyebath, padding liquor or print paste containing the said dyestuff, or dyestuffs can be prepared in conventional manner from an aqueous dispersion of the said dyestuff. Alternatively the aqueous dyebath, padding liquor or print paste can be prepared using a water-soluble alkali metal or ammonium salt of the said dyestuff, followed by acidification to precipitate the dyestuff in finally divided form. Such acidification is preferably carried out before application of the dyebath, padding liquor or print paste to the polyamide textile material, but, if desired, it can be carried out by applying the dyebath, padding liquor or print paste containing the alkali metal or ammonium salt of the dyestuff to the polyamide textile material and then acidifying.

As examples of synthetic polyamide textile materials which can be colored by the process of the invention there may be mentioned Nylon 6, Nylon 6:6 and Quiana (a registered trade mark) textile materials.

Such textile materials can be in the form of yarns, webs or woven or knitted goods which can be either in continuous lengths or in the form of made-up garments, such as dresses, or the individual pieces used in the construction of such garments. The term synthetic textile materials also includes goods, such as carpets and other floor coverings, or flocked materials having a pile or tufts or a flock surface consisting of synthetic fibres.

The said tanning agents can be any such agents which are conventionally employed with synthetic polyamide textile materials, and can be either natural or synthetic in origin.

Examples of natural agents including tannic acid and the vegetable tannins, while synthetic agents include condensation products of naphthols, naphthalene sulphonic acids and formaldehyde, condensation products of phenol, naphthalene, formaldehyde and sulphuric acid, condensation products of dihydroxydiphenylsulphones and bisulphites, condensation products of naphthalene sulphonic acids, dihydroxydiphenylsulphone and formaldehyde, condensation products of dihydroxydiphenylsulphone sulphonic and aliphatic aldehydes, condensation products of sulphurized phenols, naphthalene and formaldehyde.

The said dyestuffs can be any of the recognized classes of disperse dyestuffs which additionally contain one or more carboxylic acid groups, in particular disperse dyestuffs of the styryl, nitro, azo, anthraquinone, or quinophthalone series which additionally contain one or more carboxylic acid groups. Many such dyestuffs are in fact known and can be manufactured in conventional manner from the requisite dyestuff intermediates at least one of which contains a carboxylic acid group. As specific examples of such dyestuffs which can be used in the process of the present invention there may be mentioned the dyestuffs of the following classes:-

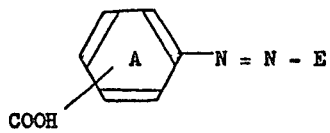

wherein E is the residue of a coupling component of the phenol, naphthol, barbituric acid, acylacetarylamide or 5-pyrazolone series, and the benzene ring A can contain additional substituents such as nitro, chlorine, methyl, methoxy, carboxy or sulphonamido.

b. The azo dyestuffs of the formula:-

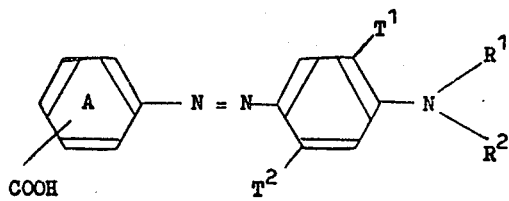

wherein $T^1$ is hydrogen, alkyl, alkoxy, chlorine or bromine, $T^2$ is hydrogen, alkyl, alkoxy, chlorine, bromine or acylamino, $R^1$ is hydrogen or an optionally substituted alkyl radical, $R^2$ is hydrogen or an optionally substituted alkyl, cycloalkyl, phenol or heterocyclic radical, and the benzene ring A can contain additional substituents.

c. The azo dyestuffs of the formula:-

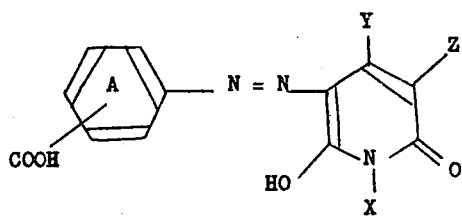

wherein X is hydrogen or an optionally substituted alkyl, cycloalkyl or phenyl radicals or an optionally substituted amino group, Z is hydrogen, alkyl, cyano, carboalkoxy or carbonamido, Y is hydrogen, alkyl or phenyl, and the benzene ring A can contain additional substituents.

d. The azo dyestuffs of the formula:

wherein D is the radical of a diazo component of the aromatic or heterocyclic series and $E^1$ is the radical of a coupling component which contains a carboxylic acid group in particular a coupling component of the phenol, naphthol, pyrazoline, acylacetarylamide, 2:6-dihydroxypyridine or 6-hydroxypyrid-2-one series which contains a carboxylic acid group.

e. The azo dyestuffs of the formula:

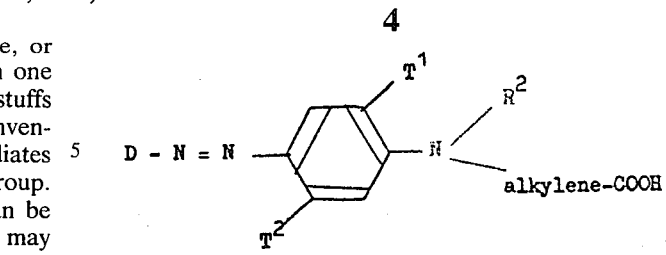

wherein D, $R^2$, $T^1$ and $T^2$ have the meanings stated above.

f. The anthraquinone dyestuffs of the formula:

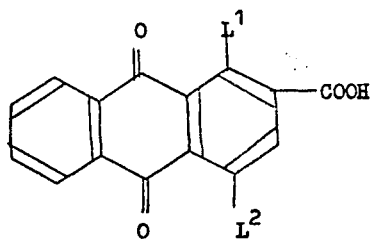

wherein $L^1$ and $L^2$ are each independently hydroxy, amino, alkylamino or arylamino.

g. The anthraquinone dyestuffs of the formula:

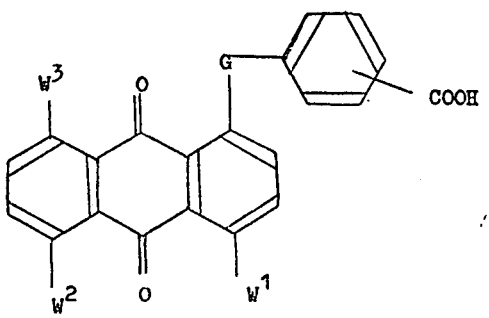

wherein G is —O—, —S—, —NH— or —CONH—, and $W^1$, $W^2$ and $W^3$ are each independently hydrogen, hydroxy, amino, alkylamino or nitro, provided that not all of $W^1$, $W^2$ and $W^3$ are hydrogen and that not more than one of $W^1$, $W^2$ and $W^3$ is nitro.

h. The quinophthalone dyestuffs of the formula

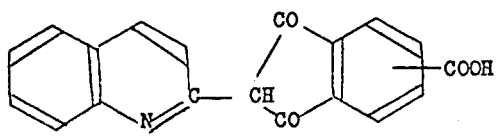

and the quinoline nucleus can be additionally substituted by hydroxy, chlorine, bromine, nitro, alkyl or alkoxy.

i. The nitro dyestuffs of the formula

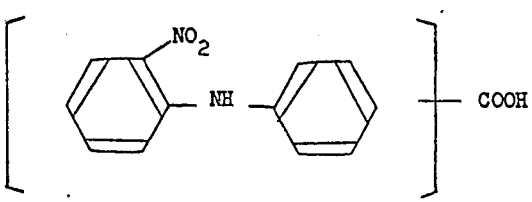

and the benzene rings can contain additional substituents such as nitro, chlorine, bromine, hydroxy sulphonamido, methyl and methoxy.

By the process of the invention synthetic polyamide textile materials are uniformly colored in a wide variety of shades possessing excellent fastness to wet treatments.

The invention is illustrated but not limited by the following Examples in which the parts and percentages are by weight.

EXAMPLE 1

A solution of 0.26 part of the ammonium salt of 1-ethyl-3-cyano-4-methyl-5-(p-carboxymethylthiophenylazo)-6-hydroxypyrid-2-one and 2 parts of the sodium salt of a naphthalene sulphonic acid/dihydroxydiphenylsulphone/formaldehyde condensate are dissolved in 2450 parts of water, and formic acid is then added to give a pH of 3.2. 100 Parts of a knitted Nylon 6:6 textile material are introduced into the resulting dyebath at 40°C, and dyeing then carried out for 60 minutes at 100°C. The dyed textile material is then removed from the dyebath, rinsed in water and dried.

A deep, level, orange dyeing is obtained possessing excellent fastness to wet treatments. A control dyeing preparing as described above but omitting the tanning agent had poor fastness to wet treatments.

EXAMPLE 2

4 Parts of the dyestuff of the formula

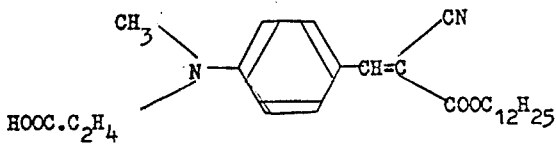

are dispersed by milling in 100 parts of water containing 0.1 part of the disodium salt of bis(2-sulphonaphth-1-yl)methane, and the dispersion is then added to 1200 parts of water containing 1 part of a naphthalene sulphonic acid/dihydroxydiphenylsulphone/formaldehyde condensate and 0.5 part of acetic acid. The temperature of the dyebath is raised to 40°C, 50 parts of a woven Nylon 6:6 textile material are introduced into the dyebath, and dyeing then carried out for 45 minutes at 100°C.

A bright yellow dyeing of excellent wet fastness properties is obtained, and the dyeing is free of fibre to fibre unlevelness.

EXAMPLE 3

A print paste is prepared by adding 33 parts of a 9% aqueous solution of locust bean gum ether and 3 parts of a naphthalene sulphonic acid/dihydroxydiphenylsulphone/formaldehyde condensate to a solution of 0.3 part of the sodium salt of 2-bromo-4-nitro-6-chloro-4'-[N-ethyl-N-(β-(β'-carboxypropionyloxy) ethyl)amino] azobenzene in 62.7 parts of water, and then adding 1 part of tartaric acid.

The print paste is applied by screen printing to a texturized Nylon 6:6-textile material, the print dried and then steamed for 30 minutes at atmospheric pressure. The print is then rinsed in a 0.1% aqueous solution of sodium carbonate at 20°C, then in a solution at 60°C containing 0.1% of sodium carbonate and 0.2% of a synthetic detergent, then in water and is finally dried.

A brown print of excellent wet fastness properties is obtained and the print is free of fibre to fibre unlevelness.

EXAMPLE 4

A print paste is prepared comprising:-

| | |
|---|---|
| Sodium salt of N-ethyl-N-[β-(β'-carboxyethoxy)ethyl]-2-methyl-4-(3'-ethoxycarbonyl-5'-nitrothiophen-2'-ylazo)aniline | 0.3 part |
| Water | 25.7 parts |
| 4% Aqueous solution of sodium alginate | 20.0 parts |
| 80:20 Emulsion of white spirit and water | 50.0 parts |
| Naphthalene sulphonic acid/dihydroxydiphenylsulphone/formaldehyde condensate | 3.0 parts |
| | 99.0 parts | and 1 part of tartaric acid is then added.

The resulting paste is applied by roller printing to a texturized woven Nylon 6:6 textile material, the material is dried and then steamed for 6 minutes in superheated steam at 170°C. The material is rinsed for 5 minutes at 60°C in water containing 0.1% of sodium carbonate and 0.2% of a synthetic detergent, then in water and is finally dried.

A blue print of excellent wet fastness properties is obtained, and the print is free from fibre to fibre unlevelness.

EXAMPLE 5

100 Parts of a woven Nylon 6:6 textile material are immersed for 30 minutes in 1000 parts of a 0.3% aqueous solution of a naphthalene sulphonic acid/dihydroxydiphenylsulphone/formaldehyde condensate and 0.3% of formic acid at 95°C. The material is then removed from the bath, rinsed in water and dried.

A print paste comprising

| | |
|---|---|
| 4-(2'-cyano-4'-nitrophenylazo)-N-methyl-N-(β-carboxyethyl)aniline | 0.7 part |
| 9% Aqueous solution of a locust bean gum ether | 33.3 parts |
| Ammonium acetate | 5 parts |
| Water | 61 parts |
| | 100 parts | is applied by screen-printing to the so-treated material, which is dried and then steamed for 30 minutes at 102°C under atmospheric pressure. The resulting print is rinsed for 10 minutes in an aqueous alkaline solution of a synthetic detergent, then in water and is finally dried.

A reddish-violet print of excellent wet fastness properties is obtained.

EXAMPLE 6

A woven Nylon 6:6 textile material is padded through a liquor comprising:

| | |
|---|---|
| 3'-Chloro-4-nitro-4'-[β-(β'-carboxypropionyloxy) ethylamino]azobenzene | 0.4 part |
| Disodium salt of bis(2-sulphonaphth-1-yl)methane | 0.01 part |
| Naphthalene sulphonic acid/dihydroxydiphenylsulphone/formaldehyde condensate | 3 parts |
| Citric acid | 1 part |

Sodium alginate                1 part
Water                          94.59 parts
                               ─────────
                               100 parts The textile material is then squeezed between rollers so that it retains 80% of the said liquor (based on the weight of the textile material) and dried. The dried material is split into three portions which are then subjected to one of the following treatments:
a. Steamed for 8 minutes with superheated steam at 180°C
b. Steamed for 30 minutes with saturated steam at atmospheric pressure
c. Baked for 1 minute in hot air at 200°C The three portions of material are then rinsed for 10 minutes in an aqueous alkaline solution of a synthetic detergent, rinsed in water and finally dried.

In each case a level orange dyeing of excellent wet fastness properties is obtained.

In place of the dyestuffs (or the corresponding water-soluble salts) used in any of the above Examples there are used the dyestuffs (or the corresponding water-soluble salts) listed in the second column of the Table whereby the polyamide textile materials are colored in the shades listed in the third column of the Table. In all cases level colorations of excellent wet fastness properties are obtained.

| EXAMPLE | DYESTUFF | SHADE |
|---|---|---|
| 7 | 1-phenyl-3-ethoxycarbonyl-4-(3'-hydroxymethyl-4'-carboxyphenylazo)-5-pyrazolone | Yellow |
| 8 | 2-chloro-4-cyano-2'-acetylamino-4'-[N-ethyl-N-(β-carboxyethyl)amino]-5'-methoxyazobenzene | Rubine |
| 9 | 2:5-dichloro-2'-acetylamino-4'-(N-β-carboxyethylamino)-5'-methoxyazobenzene | Scarlet |
| 10 | 3-hydroxy-5'-carboxy-6'-octyloxycarbonylquinophthalone | Yellow |
| 11 | 2-methyl-4-(3'-phenyl-1':2':4'-thiadiazol-5'-ylazo)-N-ethyl-N-[β-(β'-carboxypropionyloxy)ethyl]aniline | Bluish-red |
| 12 | 1-amino-4-(2'-carboxyanilino) anthraquinone | Blue |

We claim:

1. Process for coloring synthetic polyamide textile materials to produce level coloration having excellent wet fastness properties which consists essentially of applying to the said textile materials by a dyeing, padding or printing process an aqueous dispersion of pH less than 7 containing a disperse dyestuff of the azo, anthraquinone, nitro, styryl or quinophthalone series containing a carboxylic acid group, said application being carried out in the presence of a tanning agent selected from tannic acid, vegetable tannin, condensation product of naphthol, naphthalene sulphonic acid and formaldehyde, condensation product of phenol, naphthalene, formaldehyde and sulphuric acid, condensation product of dihydroxydiphenylsulphone and bisulphite, condensation product of naphthalene sulphonic acid, dihydroxydiphenylsulphone and formaldehyde, condensation product of dihydroxydiphenylsulphone sulphonic acid and aliphatic aldehyde or condensation product of sulphurized phenol, naphthalene and formaldehyde.

2. Process as claimed in claim 1 wherein said tanning agent is applied to the synthetic polyamide textile material which is dried, and the pre-tanned synthetic polyamide textile material is then dyed, padded or printed with an aqueous dispersion of pH less than 7 of a disperse dyestuff of the azo, anthraquinone, nitro, styryl or quinophthalone series containing a carboxylic acid group.

3. Process as claimed in claim 1 wherein the synthetic polyamide textile material is dyed in an aqueous dispersion of pH in the range of 3 to 5 of a disperse dyestuff of the azo, anthraquinone, styryl, nitro or quinophthalone series containing a carboxylic acid group, which aqueous dispersion also contains said tanning agent, the dyeing being carried out at a temperature between 80°C and the boiling point of the aqueous dispersion.

4. Process as claimed in claim 1 wherein the synthetic polyamide textile material is printed with a print paste comprising an aqueous dispersion of pH in the range of 3 to 5 of a disperse dyestuff of the azo, anthraquinone, nitro, stryl or quinophthalone series containing a carboxylic acid group, and which aqueous dispersion also contains said tanning agent, the printed textile material is dried and is then subjected to the action of dry heat or steam.

5. Process as claimed in claim 1 wherein the synthetic polyamide textile material is padded with a padding liquor comprising an aqueous dispersion of pH in the range of 3 to 5 of a disperse dyestuff of the azo, anthraquinone, nitro, styryl or quinophthalone series containing a carboxylic acid group, and which textile material is dried and is then subjected to the action of dry heat or steam.

* * * * *